US008493636B2

(12) United States Patent
Kim et al.

(10) Patent No.: US 8,493,636 B2
(45) Date of Patent: Jul. 23, 2013

(54) MOTION TRACKING METHOD USING SCANNING DEVICE

(75) Inventors: Jinwook Kim, Seoul (KR); Seungpyo Hong, Yongin-Si (KR); Heedong Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 218 days.

(21) Appl. No.: 13/123,084

(22) PCT Filed: Nov. 21, 2008

(86) PCT No.: PCT/KR2008/006881
§ 371 (c)(1),
(2), (4) Date: Apr. 7, 2011

(87) PCT Pub. No.: WO2010/044509
PCT Pub. Date: Apr. 22, 2010

(65) Prior Publication Data
US 2011/0194158 A1    Aug. 11, 2011

(30) Foreign Application Priority Data
Oct. 14, 2008 (KR) ........................ 10-2008-0100469

(51) Int. Cl.
*H04N 1/04* (2006.01)
(52) U.S. Cl.
USPC ............................ 358/474; 358/475; 358/486
(58) Field of Classification Search
USPC .......................... 358/474, 486, 497, 496, 475
See application file for complete search history.

(56) References Cited

U.S. PATENT DOCUMENTS

| 2,800,797 | A  | * | 7/1957 | Honstead ................. 73/863.61 |
| 6,392,762 | B1 | * | 5/2002 | Tsai et al. ..................... 358/488 |
| 6,608,297 | B2 | * | 8/2003 | Neukermans et al. ..... 250/208.1 |
| 7,206,103 | B2 | * | 4/2007 | Sakaguchi .................... 358/474 |
| 7,477,425 | B2 | * | 1/2009 | Haas et al. .................... 358/474 |
| 7,502,147 | B2 | * | 3/2009 | Suzuki et al. ................. 358/504 |

(Continued)

FOREIGN PATENT DOCUMENTS

| WO | WO 00/26852 A1 | 5/2000 |
| WO | WO 03/079672 A1 | 9/2003 |

OTHER PUBLICATIONS

PCT International Search Report and Written Opinion, PCT/KR2008/006881, Jun. 29, 2009, 7 Pages.

*Primary Examiner* — Negussie Worku
(74) *Attorney, Agent, or Firm* — Fenwick & West LLP

(57) ABSTRACT

The motion tracking method disclosed herein suggests a method for precisely tracking the motion of a scanning device by correcting the surrounding information distortedly recognized due to the time differences between pieces of information regarding the surroundings of the device over one scanning cycle. The method, as a motion tracking method of a scanning device collecting the surrounding information corresponding to a plurality of the points of the surroundings, includes collecting the surrounding information, obtaining the displacement data of the scanning device using the surrounding information, updating the velocity of the scanning device using the displacement data of the scanning device, correcting the surrounding information using the updated velocity of the scanning device, and determining location and position information of the scanning device using the corrected surrounding information. According to the method herein, the motion of the scanning device may be more precisely tracked because the surrounding information is corrected based on the velocity of the scanning device.

9 Claims, 7 Drawing Sheets

U.S. PATENT DOCUMENTS

| | | | |
|---|---|---|---|
| 7,593,144 B2 * | 9/2009 | Dymetman | 358/474 |
| 7,800,787 B2 * | 9/2010 | Shimizu | 358/474 |
| 7,800,797 B2 * | 9/2010 | Suzuki | 358/497 |
| 7,843,609 B2 * | 11/2010 | Caster et al. | 358/474 |
| 7,843,610 B2 * | 11/2010 | Hoshi | 358/474 |
| 7,876,477 B2 * | 1/2011 | Toma et al. | 358/474 |
| 8,040,577 B2 * | 10/2011 | Akiyama | 358/486 |
| 8,259,365 B2 * | 9/2012 | Sakamoto | 358/474 |
| 2002/0141626 A1 | 10/2002 | Caspi | |
| 2005/0203385 A1 | 9/2005 | Sundar et al. | |

* cited by examiner

[Fig. 12]
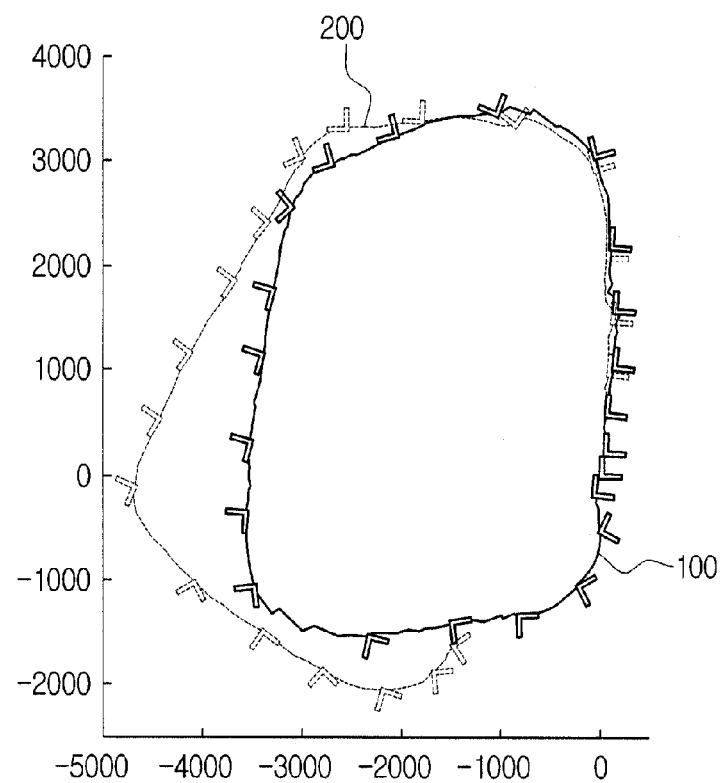
Fig. 13
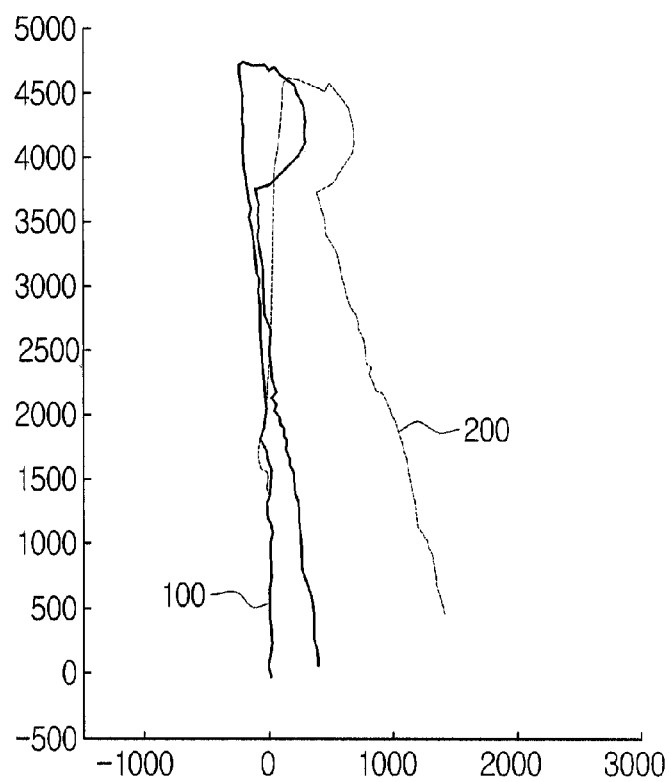

MOTION TRACKING METHOD USING SCANNING DEVICE

TECHNICAL FIELD

Disclosed herein is a method for tracking the motion of a scanning device, more specifically a method for tracking more accurately the motion of a scanning device by correcting information on surroundings, which is distortedly recognized due to a time delay between data included in the surrounding information collected over one cycle of scanning process by the scanning device.

BACKGROUND ART

One of the greatest concerns in such fields as virtual reality or robotics is to track accurately the motion of a moving object in certain surroundings. Several methods have been used to track the motion of a moving object, and widely used is, among others, the method of tracking the motion of an object by means of a scanning device that collects surrounding information. The surrounding information is defined as information on surroundings based on the distance to an obstacle that is within a detectable range of the scanning device.

Namely, the scanning device mounted on an object collects the surrounding information, and then evaluates location and position information of the device based on data of the distance to the collected surrounding obstacles. The location information includes data of the spot where the scanning device is located in any absolute coordinate system. The position information includes data of the amount by which the scanning device is rotated with respect to the absolute coordinate system. While moving, the scanning device continues to collect such pieces of information and evaluate the location information and the position information, and keeps on tracking the motion of the scanning device within its surroundings. In a technical sense, tracking the motion of the scanning device is identical to tracking the motion of the moving object.

A laser scanning device has been widely used as a scanning device for the aforementioned method. FIG. 1 generally explains the motion of the laser scanning device 5. As illustrated in FIG. 1, the laser scanning device 5 is provided with a rotating portion that is operated by a motor 6. The rotating portion rotates once over a period of time $\Delta t$. During the time period $\Delta t$, the laser scanning device 5 emits a laser, at a constant time interval $\Delta t_s$, sequentially to each of a plurality of the points in its surroundings, and collects the distance information for each of the points in its surroundings by calculating the time taken to turn back from the points to the device. Namely, the information, which is measured by the scanning device 5 during the period of time $\Delta t$, is collected at the constant time interval $\Delta t_s$ and is classified by each of the points. The pieces of the surrounding information classified by each of the points are not measured at the same time, but are collected at different times, i.e. with the time interval $\Delta t_s$.

If the laser scanning device 5 does not move but stays fixed at a spot, the distance from the device 5 to its surroundings will be constant even though the information for the points are measured at different times. In this case, the surrounding information obtained from the distance data of the surroundings will be identical to the information on the actual surroundings. That is, the motion of the laser scanning device 5 will be precisely calculated only from the surrounding information intermittently obtained in the surroundings of the device. However, as the scanning device, i.e. the laser scanning device 5, is continuously moving while scanning, the surrounding information measured during the period of time $\Delta t$, as stated above, are collected at different times with respect to each of the points of the surroundings. Thus, the surrounding information gathered during one cycle of scanning process is distorted, being different from the actual shapes of the surroundings. This causes the laser scanning device 5 not to track accurately the location and position of the device in its surroundings.

FIGS. 2 to 4 are conceptual views illustrating the surrounding information collected by a scanning device moving around.

FIG. 2 represents the outline of the surroundings 1 as a solid line. The scanning device is shown as a dot in the middle, and moves following the arrow in the figure. As shown in FIG. 3, when the scanning device moves in a direction of the arrow for the period of time $\Delta t$ corresponding to one scanning cycle, the surrounding information 2, which has approached toward the device by the amount of distance through which the device moved, will be identified by the scanning device. Because the initial surroundings 1 do not change its shape, it is to be assured that the scanning device keeps on identifying the surrounding information as the initial surroundings 1.

However, as stated above, the scanning device collects the surrounding information with the time interval $\Delta t_s$ during the period of time $\Delta t$, i.e. the scanning device collects the surrounding information while moving, and thus the scanning device identifies distorted surrounding information 3, as illustrated in FIG. 4. As such, determination of the present location and position information based on the distorted surrounding information 3 leads to an inaccurate detection of the motion of the scanning device. This problem gets worse as the time interval $\Delta t_s$ and/or the velocity of the scanning device increase(s).

DISCLOSURE OF INVENTION

Technical Problem

The method disclosed herein is to resolve the problems stated above, and to provide a method for tracking precisely the motion of a scanning device, wherein the method calculates the velocity of the scanning device based on displacement data of the device obtained from the surrounding information by one cycle of scanning operation, and, based on the calculated velocity, corrects the surrounding information to be undistorted.

Technical Solution

Disclosed herein is a method for tracking the motion of a scanning device, which collects, with a time interval $\Delta t_s$ over a period of time $\Delta t$ for one cycle of scanning process, the surrounding information that corresponds to a plurality of the points of surroundings. The method includes collecting the surrounding information by the (n)th scanning process, where n=2, and n is a natural number (S1); comparing the surrounding information by the (n)th scanning process and the surrounding information by a previous scanning process, and obtaining the displacement data of the scanning device based on that comparison (S2); updating the velocity of the scanning device using the displacement data of the scanning device obtained in S2 (S3); correcting the surrounding information collected over the (n)th scanning process, based on the velocity of the scanning device updated in S3 and the time interval $\Delta t_s$ (S4); and determining location and position information of the scanning device using the surrounding information collected over said (n)th scanning process and corrected in S4 (S5).

Further, disclosed herein may be a method further including evaluating whether the velocity of the scanning device newly updated in S3 converges to a constant value (S6). If the velocity of the scanning device newly updated in S3 does not converges to a constant value, S2 and S3 may be repeated using the surrounding information by the (n)th scanning process corrected in S4. And, if the velocity of the scanning device newly updated in S3 converges to the constant value, S5 may proceed.

The surrounding information by a previous scanning process in S2 may be obtained, by being compared with the surrounding information collected and corrected over the (n−1)th scanning process and used for determining the location and position information of the scanning device.

The velocity of the scanning device in S3 may be updated based on the relationship between the displacement data of the scanning device obtained in S2 and the period of time $\Delta t$ of one cycle of scanning process.

The time interval $\Delta t_s$ may be constant.

In one aspect, for determining whether the velocity of the scanning device newly updated in S3 converges to a constant value in S6, the velocity of the scanning device lastly updated using the surrounding information collected over the (n−1)th scanning process may be used as a reference firstly, and hereafter, the velocity of the scanning device just previously updated may be used as the reference.

In other aspect, for determining whether the velocity of the scanning device updated in S3 converges to a constant value in S6, zero (0) may be used as a reference firstly, and hereafter, the velocity of the scanning device just previously updated may be used as the reference.

S2 may proceed with the ICP (Iterative Closet Point, or Iterative Corresponding Point) algorithm.

The scanning device used herein may be a 2D or 3D laser scanning device.

Advantageous Effects

According to the motion tracking method disclosed herein, the motion of a scanning device may be more precisely tracked because the surrounding information is corrected based on the velocity of the device.

BRIEF DESCRIPTION OF DRAWINGS

FIGS. 12 and 13 illustrate the results of the experiments in which the motion tracking method according to the embodiment of the invention is used.

BEST MODE FOR CARRYING OUT THE INVENTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein.

Figure 5:
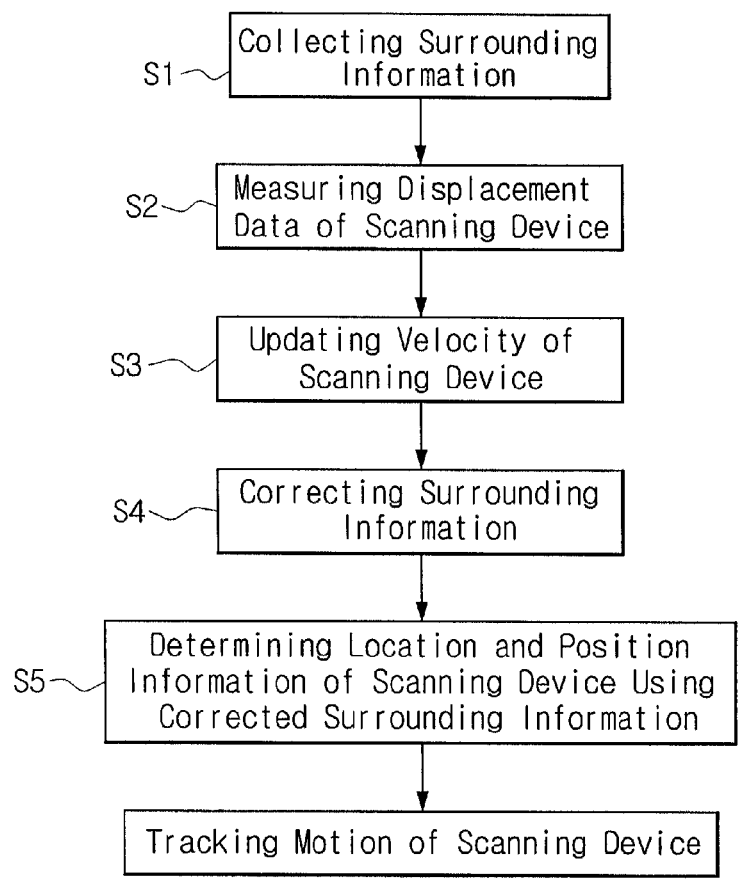
FIG. 5 is a flow chart representing the concept of the motion tracking method of a scanning device according to one embodiment.

FIG. 5 is a flow chart representing the idea of a method for tracking the motion of a scanning device according to the embodiment of the method. As illustrated in FIG. 5, the method for tracking the motion of the scanning device according to the embodiment collects the surrounding information (S1), measures the displacement data of the scanning device (S2), and then calculates the velocity of the scanning device (S3). Further, the method corrects the surrounding information (S4), and determines the present location and position information of the scanning device (S5), thereby tracking the motion of the scanning device.

The scanning device according to the embodiment may be a 2D laser scanning device collecting the information of the surroundings located on a plane.

Figure 1:
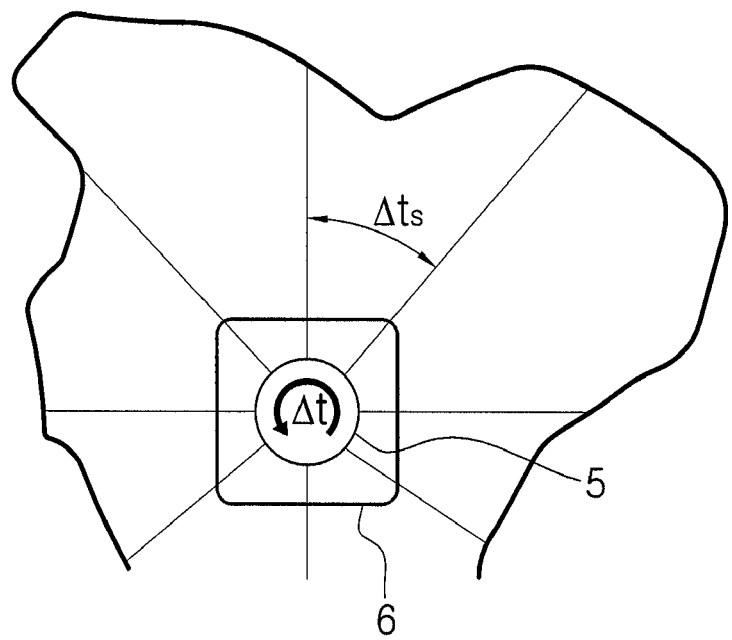
FIG. 1 illustrates a general motion of a laser scanning device 5.
Figure 2:
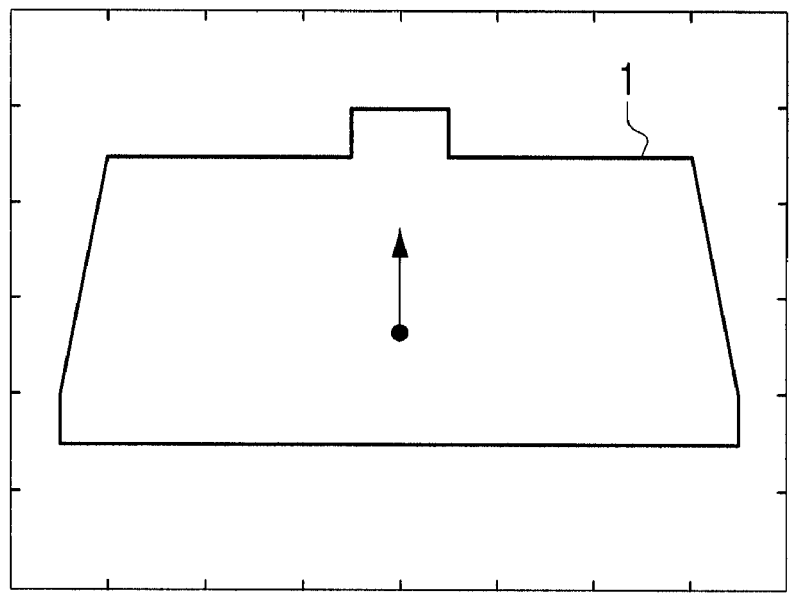
FIGS. 2 to 4 are conceptual views representing the surrounding information collected by the moving scanning device.
Figure 3:
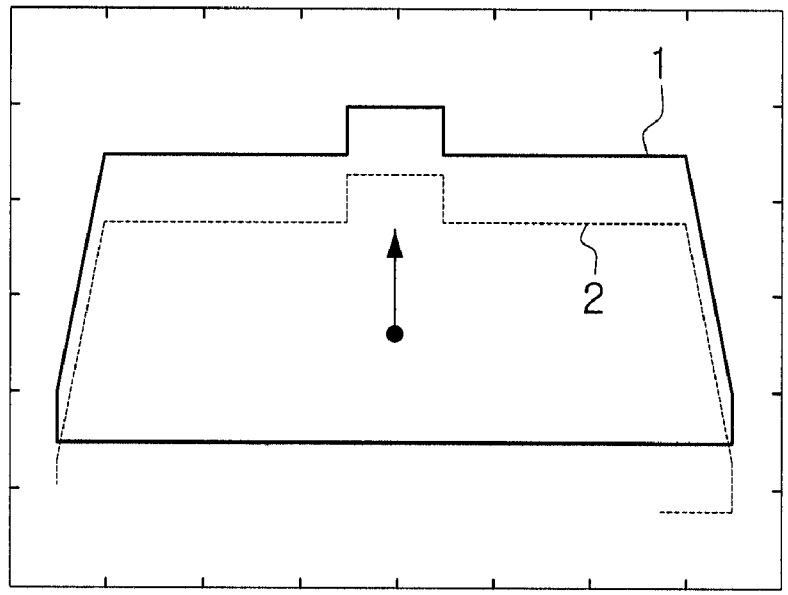
Figure 4:
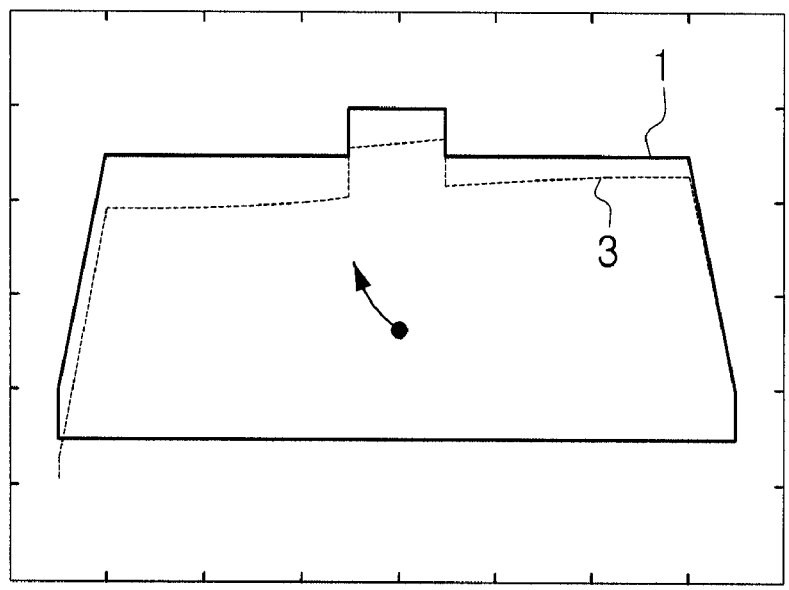

The 2D scanning device is provided with a rotating portion that is operated by a motor. While the rotating portion rotates and emits a laser sequentially to each of a plurality of the points in the surroundings at a constant time interval $\Delta t_s$ during the period of one scanning time $\Delta t$, the device collects the surrounding information (refer to FIG. 1). "The surrounding information herein is defined as data of the distance obtained either by analyzing the phase difference between the emitted and the reflected lasers, or by measuring a period of time in which the laser emitted from the scanning device reaches an object in the surroundings and returns to the device. The shorter the period of one scanning time $\Delta t$ and the constant time interval $\Delta t_s$ are, the more precise the surrounding information, which approximates the actual or initial surroundings, is obtained by the 2D laser scanning device.

The scanning device used in this embodiment is the 2D laser scanning device, but is not limited to this type of the device. Any device, which collects the surrounding information with the time interval $\Delta t_s$ during the period of one scanning time $\Delta t$, may be used in the method disclosed herein. That is, any scanning device, in which pieces of the surrounding information collected during one cycle of scanning are not obtained simultaneously at a given time, and are collected at different times by different points of the surroundings, causing time intervals between the data scanned during one cycle of scanning, may be applied to the method disclosed herein. Instead of the 2D laser scanning device that collects information of the surroundings placed on a plane, a 3D laser scanning device may be used for the method. The time interval $\Delta t_s$ need not necessarily be constant.

According to the embodiment, the 2D laser scanning device collects the surrounding information by the (n)th scanning process, where n is a natural number 2 or larger (S1). The surrounding information by the (n)th scanning process, which is collected by the 2D laser scanning device, is defined as a set of the distance data regarding a plurality of points of the surroundings recognized by the scanning device at the time of completion of the (n)th scanning.

As stated above, when the 2D laser scanning device does not stay but continuously moves, the data including the surrounding information by the (n)th scanning process are distorted ones, which are inconsistently recognized with the actual surroundings due to the time interval $\Delta t_s$ for each of the points. If the location and position information of the 2D laser scanning device, at the time of completion of the (n)th scanning, are determined with the distorted surrounding information, the error between the distorted and the actual surrounding information will not lead to precise tracking of the motion of the device.

Thus, in order to track precisely the motion of the 2D laser scanning device, the surrounding information should be corrected to be undistorted information. In this embodiment, in order to correct the surrounding information by the (n)th scanning process, the displacement data of the 2D laser scanning device is obtained by comparing the surrounding information by the (n)th scanning process with the surrounding information by previous scanning process (S2). In other words, the location of the 2D laser scanning device at reference time is compared with the location of the device at the time of completion of the (n)th scanning, and then the relative displacement of the 2D laser scanning device between the reference time and the completion time of the (n)th scanning.

In this embodiment, the ICP (Iterative Closet Point, or Iterative Corresponding Point) algorithm is selected to measure the displacement data of the 2D laser scanning device at the time when the (n)th scanning is completed. The ICP algorithm may obtain the rigid transformation data of two surrounding information by comparing the two information collected by such a device as the 2D laser scanner, i.e. by repeatedly comparing the reference information on the surroundings with the information of the closest point or the corresponding point to a point of the surrounding information recently collected.

FIGS. 6 to 9 are conceptual views representing a method for obtaining a rigid trans-formation data, which is relative between two sets of the surrounding information, using the ICP algorithm.

Figure 6:
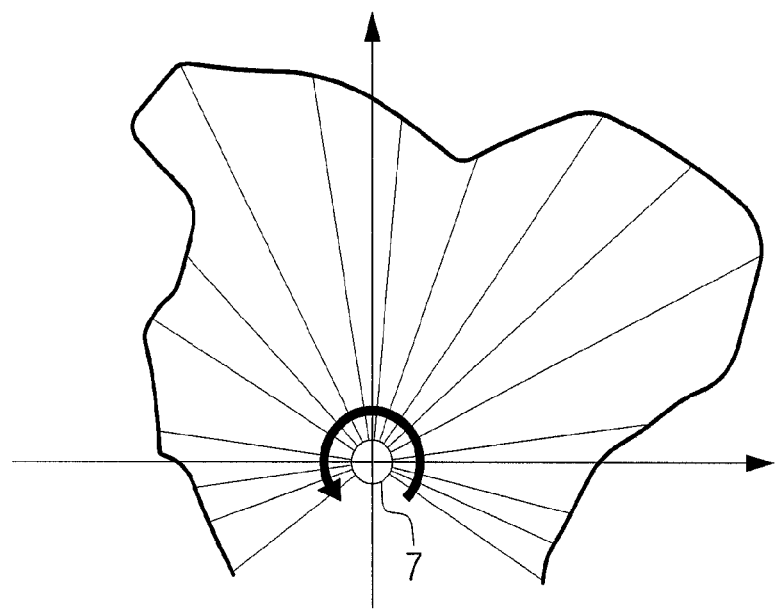
FIGS. 6 to 9 are conceptual views representing the method for obtaining the relative rigid transformation data between two sets of surrounding information, using the ICP (Iterative Closet Point, or Iterative Corresponding Point) algorithm.
Figure 7:
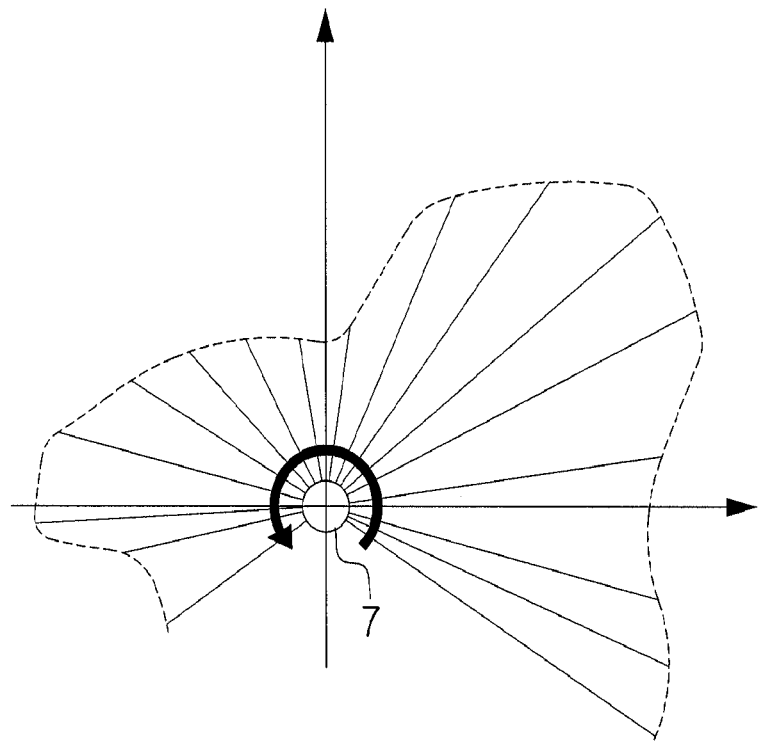

FIG. 6 illustrates the surrounding information, which amounts to the reference for measuring a displacement of the 2D laser scanning device 7. FIG. 7 describes the surrounding information by the (n)th scanning process, which is obtained by the 2D laser scanning device 7.

Figure 8:
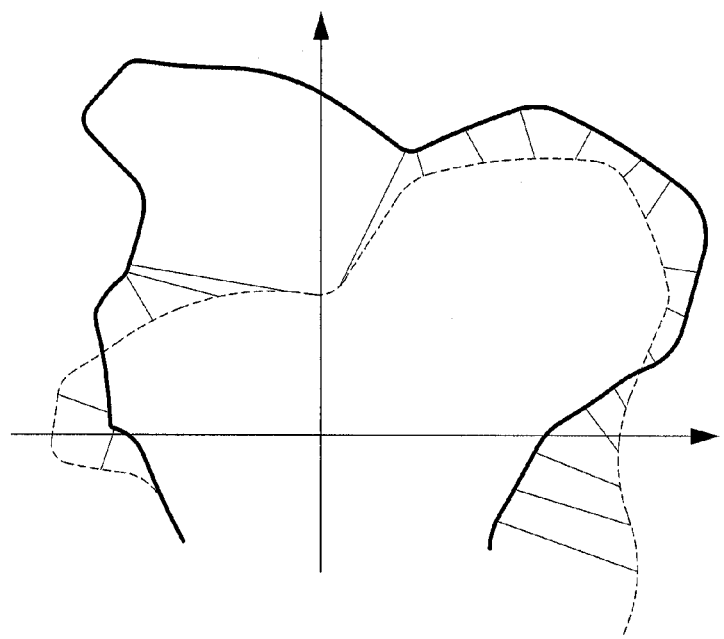
Figure 9:
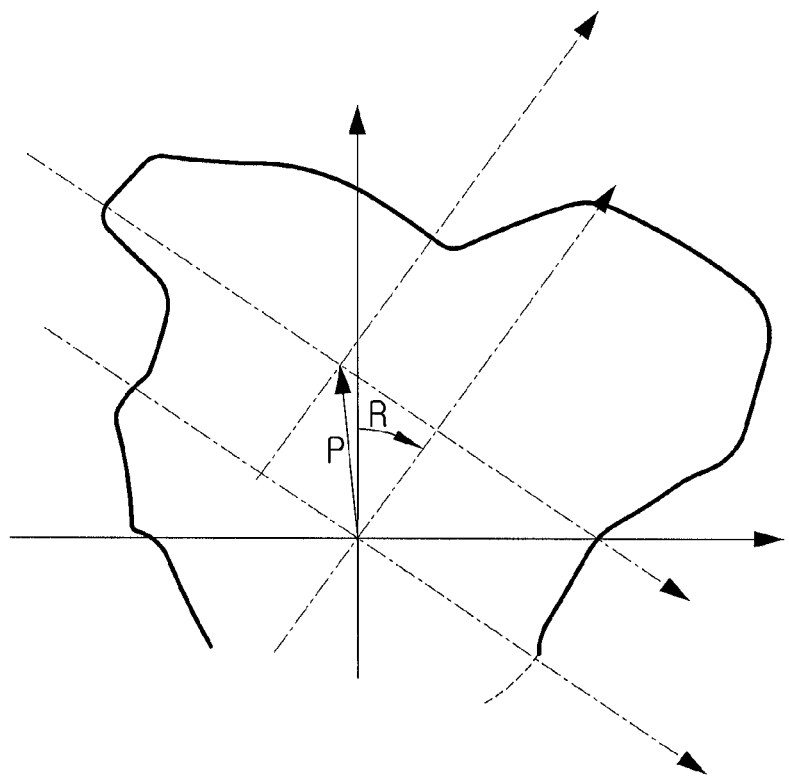

As shown in FIG. 8, the reference surroundings are repeatedly compared with their closest or corresponding points, with the coordinates of the 2D laser scanning device accorded. The outcome of this repeated comparison is depicted in FIG. 9. While the two sets of surrounding information are matched as shown in FIG. 9, the relative rigid transformation data of the coordinate is obtained with respect to the 2D laser scanning device 7. Referring to the 2D laser scanning device 7, the rigid transformation data, which is depicted as location P and rotation R, represents the displacement information of the 2D laser scanning device between the two cycles of scanning processes.

The ICP algorithm, as explained above, is widely known as a method for comparing two pieces of the surrounding information collected at two different moments, and obtaining the relative rigid transformation data regarding the information.

In the embodiment herein is, though the ICP algorithm is used to obtain the displacement data of the 2D laser scanning device, it is obvious that any other algorithm may be selected for the same purpose. So, it is possible to use any method for comparing the pieces of the surrounding information collected over two moments of operation, and obtaining the relative displacement of the 2D laser scanning device.

Reference surrounding information is required for obtaining the displacement data of the 2D laser scanning device at the time when the (n)th scanning is completed. The reference surrounding information may be information regarding the surrounding feature obtained by a scanning process prior to the (n)th scanning process. However, the large difference of times at which two pieces of the information regarding the surrounding features are collected may increase the error of the displacement data measured, so in this embodiment is the surrounding information by the (n−1)th scanning process used as the reference surrounding information.

In this case, the reference surrounding information should be precise in such an undistorted way as to obtain the accurate displacement data of the 2D laser scanning device. Thus, the surrounding information by the (n−1)th scanning process, as the reference surrounding information, is the one that is corrected using such a method as explained below, and used for determining the location and position information of the 2D laser scanning device.

While the displacement data of the 2D laser scanning device is obtained at the time when the (n)th scanning is completed, the velocity of the 2D laser scanning device at the completion time of the (n)th scanning may be calculated using the difference between the time at which the (n)th scanning is finished and the time at which the reference scanning is finished. It is assumed that the velocity of the 2D laser scanning device is steady between two moments of the times.

Since the surrounding information by the (n−1)th scanning process is used, in this embodiment, as the surrounding information for a reference scanning process, the time difference between the (n)th scanning and the reference scanning processes corresponds to one cycling period of time $\Delta t$. The velocity of the 2D laser scanning device calculated by such a method is used to correct the surrounding information by the (n)th scanning process.

Figure 10:
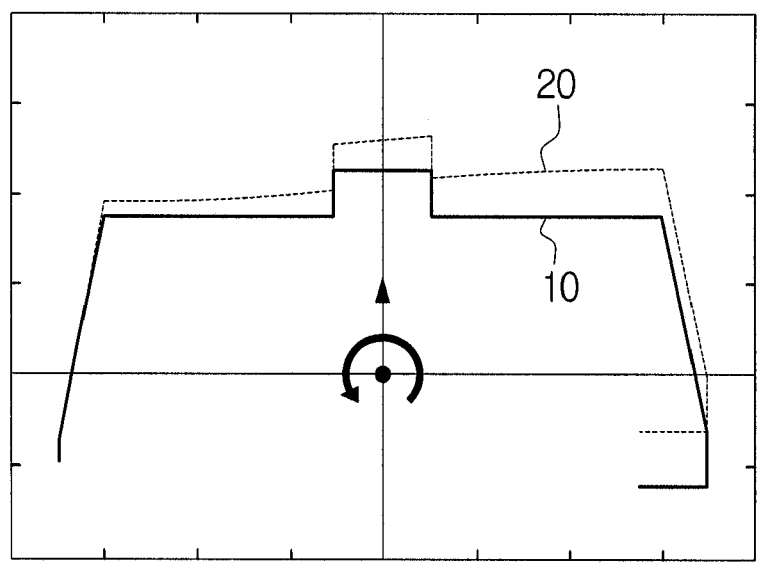
FIG. 10 is a conceptual view illustrating the results that the surrounding information by the (n)th scanning process is corrected.

FIG. 10 is a conceptual view illustrating the outcome of the corrected surrounding information by the (n)th scanning process.

Since the surrounding information by the (n)th scanning process, collected by the 2D laser scanning device, corresponds to the set of the information regarding a plurality of the points of the surroundings, each may be represented as a dot on the coordinate with respect to the 2D laser scanning device.

The surrounding information by the (n)th scanning process, over the period of time $\Delta t$ for one cycle of scanning process, is distorted from the actual surroundings due to the time interval $\Delta t_s$ during with the information is collected regarding each points of the surroundings. For example, when the information by the (n)th scanning process is collected, at first, over the negative y-axis on the coordinate with respect to the 2D laser scanning device, and then is collected counterclockwise from there, the surrounding information located at the upper right side is collected prior to the collection of the surrounding information located at the lower left side. Therefore, as the 2D laser scanning device moves in the direction of the arrow, the information of the point collected in advance is recognized as being located farther from the 2D laser scanning device than from the actual location of the device at the time when the (n)th scanning process is completed. Thus, the surrounding information collected 20 is recognized as being shaped in such a way that it is distorted in a upper right direction, compared with the undistorted shape of the surroundings 10.

Because the time interval $\Delta t_s$, during which the information of each of the points of surroundings is collected over one cycle of scanning process, is known, the relative time differences may be calculated, respectively, between the moment at which the last information by the (n)th scanning process is collected and each of the moments at which the other pieces of information prior to the last information is collected. The velocity of the 2D laser scanning device may be regarded, in reference to the 2D laser scanning device, as the velocity at which the surroundings move with respect to the 2D laser scanning device. As the velocity of the 2D laser scanning device is assumed to be constant, the surrounding information may be corrected by adding or subtracting the displacement corresponding to the time difference at each point in reference to the location of the point about which the surrounding information is collected for the last time of the (n)th scanning process.

For example, when the surrounding information by the (n)th scanning process is a set of the information about i units of points, i.e. $\{P_1, P_2, P_3, P_{i-1}, P_i\}$, and the velocity of the 2D laser scanning device is assumed as $V_n$, the time difference between the time $t_{i-2}$ at which the information $P_{i-2}$ about the (i−2)th point is collected and the time $t_i$ at which the last information $P_i$ about the (i)th point is collected is twice as long as the time interval $\Delta t_s$, i.e. $2\Delta t_s$. In this case, if the information about the (i−2)th point at the time $t_i$ is corrected to be recognized in such a way that the (i−2)th point moves at the speed—$V_n$, the information about the (i−2)th point at time $t_i$ may be corrected precisely. The information about the other points are corrected in the same way, the surrounding information by the (n)th scanning process is restored to the undistorted feature 10 at the time when the (n)th scanning process is completed.

Because the surrounding information is, as explained above, corrected with the time interval $\Delta t_s$, the displacement of each of the points, which is required for the correction, is easily calculated using the device, such as a 2D laser scanning device, by which the surrounding information is collected at the constant time interval $\Delta t_s$ over a period of time $\Delta t$ for one scanning process.

The surrounding information that is corrected as stated above is used for determining the location and position information of the 2D laser scanning device (S5). The surrounding information, which is collected and corrected over the (n)th scanning process, and then is used for determining the location and position information of the scanning device, is compared with the surrounding information by the (n+1)th scanning process, and then is used again to evaluate the displacement data of the 2D scanning device. The same operation as explained above applies to the displacement data of the 2D scanning device at the time when the (n+1)th scanning process is completed, and, in this way, the location and position information of the 2D laser scanning device may be continuously determined at every end of one scanning process. Therefore, the motion of the 2D laser scanning device may be tracked continuously and precisely tracked.

The surrounding information initially collected by the (n)th scanning process is distorted information. The displacement data of the 2D laser scanning device calculated using the ICP algorithm with the distorted information has an error, compared with the data of the actual surroundings. Thus, the velocity of the 2D laser scanning device calculated from these data has an error as well.

Therefore, according to another embodiment, a method is suggested for minimizing the error, and tracking more precisely the motion of the 2D laser scanning device.

Figure 11:
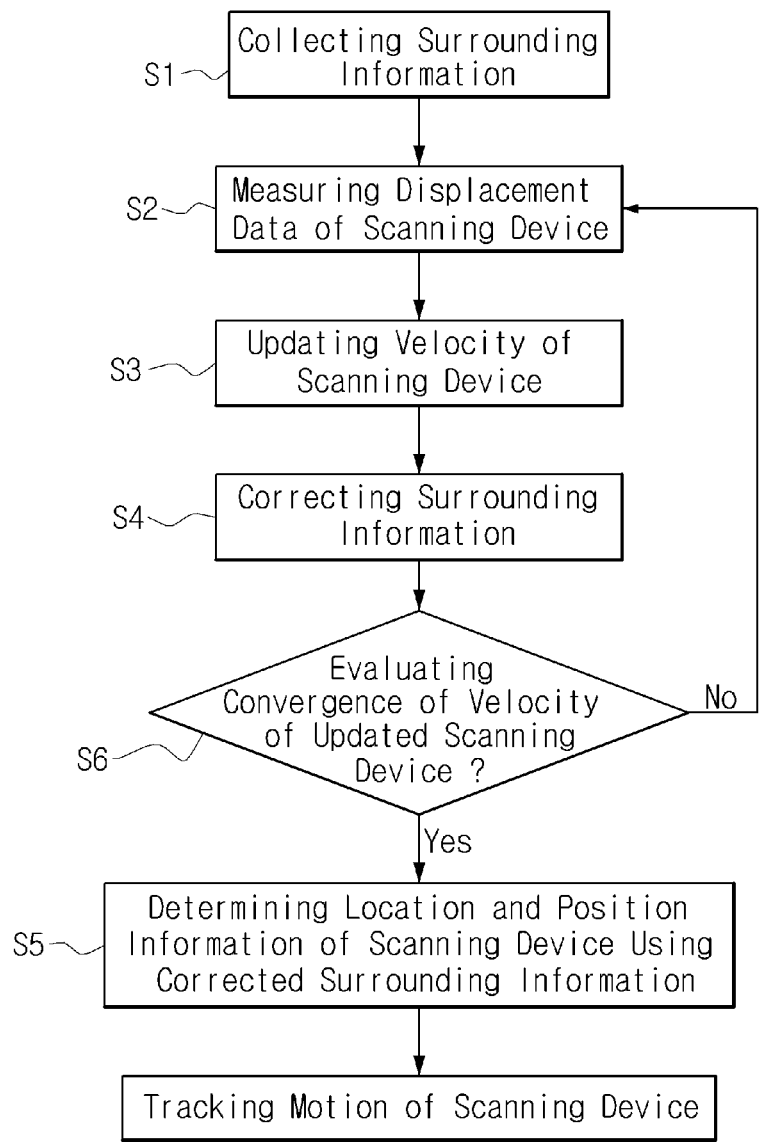
FIG. 11 is a flow chart representing the concept of the motion tracking method of a scanning device according to another embodiment.

FIG. 11 is a flow chart representing the idea of tracking the motion of the scanning device according to the embodiment.

As illustrated in FIG. 11, the method disclosed herein further includes evaluating whether the velocity of the 2D laser scanning device, which is calculated from the initial surrounding information by the (n)th scanning process, converges to a specific value (S6). In the embodiment, the velocity of the 2D laser scanning device, which is lastly updated using the surrounding information collected over the (n−1)th scanning process, is used as a reference for that evaluation. As long as the velocity of the 2D laser scanning device does not vary dramatically, it may be determined whether the velocity of the 2D laser scanning device calculated from the surrounding information by the (n)th scanning process converges, referring to the velocity of the 2D laser scanning device finally updated from the surrounding information collected over the (n−1)th scanning process. This method of the determination may contribute to reduction of the calculation time required for determining whether the velocity of the 2D laser scanning device converges or not. However, it is not necessary that the velocity of the 2D laser scanning device lastly updated from the surrounding information collected over the (n−1)th scanning process be the reference, but any value including zero (0) may be used for the reference. If it is determined whether the velocity of the 2D laser scanning device converges to any value, especially zero (0), the possibility of misunderstanding that, even though the velocities of the 2D laser scanning device are calculated to be the same between the (n−1)th and the (n)th scanning processes, the velocity of the 2D laser scanning device, which is calculated from the initial surrounding information by the (n)th scanning process that has an error due to the distorted information, converges to a constant value may be eliminated.

If the velocity of the 2D laser scanning device calculated from the initial surrounding information by the (n)th scanning process does not converge to a constant value, the displacement data of the 2D laser scanning device is corrected using the surrounding information by the (n)th scanning process, which is corrected using the value of the velocity of the 2D laser scanning device calculated from the initial surrounding information by the (n)th scanning process.

The corrected displacement data of the 2D laser scanning device is then used for updating the velocity of the 2D laser scanning device again. The corrected surrounding information by the (n)th scanning process is corrected again using the re-corrected velocity of the 2D laser scanning device.

The re-updated velocity of the 2D laser scanning device is compared with the velocity of the 2D laser scanning device just previously updated using the initial surrounding information by the (n)th scanning process, and then is determined whether its value converges to a constant value.

These procedures are repeated until the velocity of the 2D laser scanning device is updated to converge to a constant value. When the updated velocity of the 2D laser scanning device converges to a constant value, the location and the position information of the 2D laser scanning device may be determined using the finally corrected surrounding information by the (n)th scanning process, so the motion of the 2D laser scanning device may be precisely tracked.

In order to determine the location and the position information of the 2D laser scanning device, it is required to correct more precisely the surrounding information obtained by the (n)th scanning process. Further, the accurate calculation of the velocity of the 2D laser scanning device is required to correct the surrounding information by the (n)th scanning process. Moreover, the more accurate surrounding information by the (n)th scanning process is required to calculate the precise velocity of the 2D laser scanning device. That is, the precise velocity may be only obtained from the accurately corrected surrounding information, and the correction of the surrounding information needs a precise velocity of the device. These are why the repeated procedures explained above are suggested according to the embodiment. The process introduced in the embodiment makes the motion of the 2D laser scanning device be more precisely calculated and tracked.

Collecting the surrounding information (S1), calculating the displacement data (S2), and updating the velocity of the scanning device (S3) are used for the method according to this embodiment in the same way as explained in the previously embodiment, so the details of these procedures are not explained again.

FIGS. 12 and 13 illustrate the results of the experiment applying the further embodiment of the motion tracking method disclosed herein.

In order to evaluate the merit of the method disclosed herein, the 2D laser scanning device tracking its motion according to the method disclosed herein is operated to move reciprocally along a straight line and a circular trajectory, so is the 2D laser scanning device that uses a traditional method of tracking its motion based on an uncorrected surrounding information. The results of the trajectory of the motion recognized by the scanning devices are illustrated in FIGS. 12 and 13.

The laser scanning devices used in the experiment have a frequency 785 nm, an accuracy ±10 mm, a scan angle 240° and a scan time 100 msec/scan.

As found in FIGS. 12 and 13, the results of the method disclosed herein 100 tracks the motion of the device more precisely than the results of the method for tracking the motion based on the uncorrected surrounding information 200. Namely, it is obviously understood that the motion of a scanning device is very efficiently tracked using the method disclosed herein.

When the scanning device using the method disclosed herein for tracking its motion is mounted on a moving object, the motion of the moving object may be precisely tracked.

INDUSTRIAL APPLICABILITY

When the scanning device involving the motion tracking method disclosed herein is mounted on a moving object, the motion of the moving object may be tracked accurately. Thus, this method may be widely used for tracking the motion of a moving object in such a field as virtual reality or robotics.

The invention claimed is:

1. A method for tracking the motion of a scanning device, the method comprising:

collecting, at a time interval $\Delta t_s$ over a period of time $\Delta t$ for one cycle of scanning process, surrounding information by the (n)th scanning process, wherein n≧2, and n is a natural number (S1), and the surrounding information includes a set of distance data regarding a plurality of points of the surroundings recognized by the scanning device;

comparing the surrounding information by the (n)th scanning process and the surrounding information by a previous scanning process, and obtaining the displacement data of said scanning device based on that comparison (S2);

updating the velocity of said scanning device using said displacement data of said scanning device obtained in S2 (S3);

correcting the surrounding information collected over said (n)th scanning process, based on said velocity of said scanning device updated in S3 and said time interval $\Delta t_s$ (S4); and determining location and position information of said scanning device using said surrounding information collected over said (n)th scanning process and corrected in S4 (S5).

2. The method according to claim 1, further comprising evaluating whether said velocity of said scanning device newly updated in S3 converges to a constant value (S6), wherein if said velocity of said scanning device newly updated in S3 does not converge to a constant value, S2 and S3 are repeated using the surrounding information by said (n)th scanning process corrected in S4; and if said velocity of said scanning device newly updated in S3 converges to a constant value, S5 proceeds.

3. The method according to claim 1, wherein the surrounding information by said previous scanning process in S2 is collected and corrected over the (n−1)th scanning process, and is obtained, being compared with the surrounding information used for determining the location and position information of said scanning device.

4. The method according to claim 3, wherein the velocity of said scanning device in S3 is updated based on the relationship between the displacement data of the scanning device obtained in S2 and said period of time $\Delta t$ of one cycle of scanning process.

5. The method according to claim 1, wherein said time interval $\Delta t_s$ is constant.

6. The method according to claim 2, wherein the velocity of the scanning device lastly updated using the surrounding information collected over the (n−1)th scanning process is used as a reference firstly, for determining whether the velocity of said scanning device newly updated in S3 converges to a constant value in S6; and thereafter, the velocity of the scanning device just previously updated may be used as the reference.

7. The method according to claim 2, wherein zero (0) is used as a reference firstly, for determining whether the velocity of the scanning device updated in S3 converges to a constant value in S6; and thereafter, the velocity of the scanning device just previously updated may be used as the reference.

8. The method according to claim 1, wherein S2 proceeds with the ICP (Iterative Closet Point or Iterative Corresponding Point) algorithm.

9. The method according to claim 1, wherein said scanning device is a 2D or 3D laser scanning device.

* * * * *